(12) United States Patent
Matsumori

(10) Patent No.: US 7,467,100 B2
(45) Date of Patent: Dec. 16, 2008

(54) PERSONAL SHOPPING DATA SERVICE SYSTEM USING EXTENDED GAMING MACHINE MEMORY MODULE

(75) Inventor: Kunihiko Matsumori, Tokyo (JP)

(73) Assignee: Fujitsu Limited (JP)

( * ) Notice: Subject to any disclaimer, the term of this patent is extended or adjusted under 35 U.S.C. 154(b) by 934 days.

(21) Appl. No.: 10/386,322

(22) Filed: Mar. 10, 2003

(65) Prior Publication Data
US 2004/0181456 A1 Sep. 16, 2004

(51) Int. Cl.
*G06Q 30/00* (2006.01)
(52) U.S. Cl. .......................................... 705/26; 705/27
(58) Field of Classification Search .................... 705/26, 705/27
See application file for complete search history.

(56) References Cited

U.S. PATENT DOCUMENTS

| | | | |
|---|---|---|---|
| 4,386,773 A | 6/1983 | Bronstein | |
| 4,575,621 A | 3/1986 | Dreifus | |
| 5,047,614 A * | 9/1991 | Bianco | 235/385 |
| 5,420,606 A | 5/1995 | Begum et al. | |
| 5,424,524 A | 6/1995 | Ruppert et al. | |
| 5,428,528 A | 6/1995 | Takenouchi et al. | |
| 5,483,472 A | 1/1996 | Overman | |
| 5,553,139 A * | 9/1996 | Ross et al. | 705/59 |
| 5,737,153 A | 4/1998 | Gavit | |
| 5,745,681 A | 4/1998 | Levine et al. | |
| 5,761,648 A | 6/1998 | Golden et al. | |
| 5,785,598 A | 7/1998 | Hsu | |
| 5,806,044 A | 9/1998 | Powell | |
| 5,806,045 A | 9/1998 | Biorge et al. | |
| 5,809,520 A | 9/1998 | Edwards et al. | |
| 5,828,862 A | 10/1998 | Singkornrat et al. | |
| 5,855,007 A | 12/1998 | Jovicic et al. | |
| 5,870,716 A | 2/1999 | Sugiyama et al. | |
| 5,884,278 A | 3/1999 | Powell | |
| 5,884,281 A | 3/1999 | Smith et al. | |
| 5,907,350 A | 5/1999 | Nemirofsky | |
| 5,924,078 A | 7/1999 | Naftzger | |

(Continued)

OTHER PUBLICATIONS

Scally, Robert; "GameWorks: shape of things to come," Discount Store News, May 5, 1997, v36n9p62, Dialog file 148, #09834839, 4pgs.*

*Primary Examiner*—Robert M. Pond
(74) *Attorney, Agent, or Firm*—Christie, Parker & Hale, LLP.

(57) ABSTRACT

A video game machine with a portable memory module is used by a customer to generate and store a shopping list and other types of shopping related information. A retailer periodically transmits to the customer a CD-ROM storing merchandise information, coupons, and the like. The CD-ROM is run using the video game machine to generate a shopping list. The shopping list is stored in the memory module and removed from the game machine for taking during a shopping excursion. During checkout, coupons stored in the memory module are applied to a current purchase, and an electronic receipt is written to the memory module. If the customer has met a particular purchase amount, a software key may also be written to the memory module. The software key is used to activate a software program also delivered with the CD-ROM. Alternatively, the software program may be downloaded over the Internet using the video game machine, and the key to activate the software may be obtained via an automated teller machine that effectuates payment for the software.

31 Claims, 10 Drawing Sheets

U.S. PATENT DOCUMENTS

| | | | |
|---|---|---|---|
| 6,226,618 B1 * | 5/2001 | Downs et al. | 705/1 |
| 6,317,722 B1 * | 11/2001 | Jacobi et al. | 705/14 |
| 6,460,023 B1 * | 10/2002 | Bean et al. | 705/54 |
| 6,587,835 B1 * | 7/2003 | Treyz et al. | 705/14 |
| 6,616,533 B1 * | 9/2003 | Rashkovskiy | 463/31 |
| 2003/0004808 A1 * | 1/2003 | Elhaoussine et al. | 705/14 |
| 2003/0110078 A1 * | 6/2003 | Chang et al. | 705/14 |
| 2003/0158796 A1 * | 8/2003 | Balent | 705/28 |

* cited by examiner

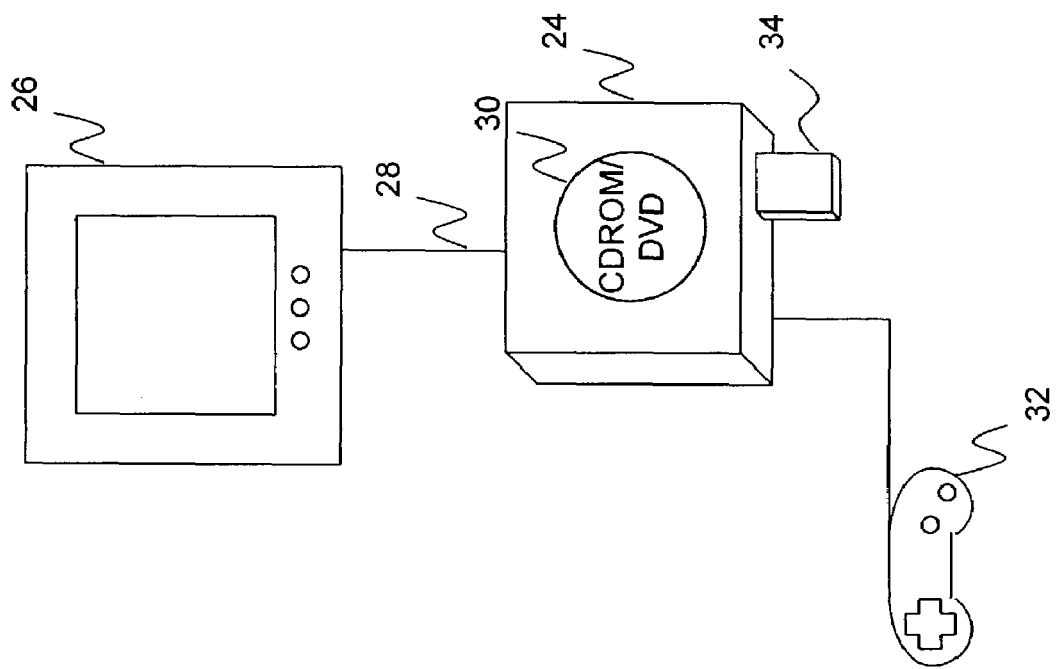

FIG. 2A

| ADDRESS | CONTENTS |
|---|---|
| 0000 | Starting address of shopping list-1 |
| 0001 | |
| 0002 | Starting address of shopping list-2 |
| 0003 | |
| 0004 | Starting address of Coupon list |
| 0005 | |
| 0006 | Starting address of electrical receipt-1 |
| 0007 | |
| 0006 | Starting address of electrical receipt-2 |
| 0007 | |
| 0008 | Starting address of Key data storage-1 |
| 0009 | |
| 000A | Starting address of Key data storage-2 |
| 000B | |
| 000C | Starting address of Key data storage-3 |
| 000D | Starting address of personal profile data |
| 000E | |
| 000F | |
| Xxxx | Header of shipping list-102a |
| | Name of store - 102c |
| | Date - 102d |
| | UPC code and quantity - 102e |
| | Ending of list flag - 102b |
| | |
| Xxxy | Header of shopping list-104a |
| | Name of store - 104c |
| | Date - 104d |
| | UPC code and quantity - 104e |
| | Ending of list flag - 104b |

| | | |
|---|---|---|
| Xxxz | Coupon-1 Header - 106a | ⎫ |
| | Coupon Code - 106b | ⎬ 106 |
| | Web site URL - 106c | ⎭ |
| Xxyx | Coupon-2 Header - 108a | ⎫ |
| | Coupon Code - 108b | ⎬ 108 |
| | Web site URL - 108c | ⎭ |
| Xxyy | Key-data header - 110a | ⎫ |
| | Key information - 110b | ⎬ 110 |
| | Key Code Area (to be loaded at payment) - 110c | ⎭ |
| Yyyy | Electronic receipt header - 112a | ⎫ |
| | Date - 112b | |
| | Store Name - 112c | |
| | Item Code (UPC) - 112d | |
| | Quantity - 112e | ⎬ 112 |
| | Price - 112f | |
| | Subtotal - 112g | |
| | Tax - 112h | |
| | Total - 112i | ⎭ |
| | | |

FIG. 2C

| | |
|---|---|
| | |
| | |
| Zzzz | Personal profile data header - 114a |
| | Name - 114b |
| | Address - 114c |
| | Age - 114d |
| | Membership ID - 114e |
| | Other profiles - 114f |
| | |
| | |
| | |

114 brackets rows 114a–114f

US 7,467,100 B2

PERSONAL SHOPPING DATA SERVICE SYSTEM USING EXTENDED GAMING MACHINE MEMORY MODULE

FIELD OF THE INVENTION

The present invention relates generally to electronic shopping systems for facilitating shopping-related activities and, more particularly, to the use of a gaming machine and associated portable memory module for creating and storing shopping related information.

BACKGROUND OF THE INVENTION

Prior to embarking on a shopping trip, a user generally makes a list of items that need to be purchased. Such items are typically written on a piece of paper and carried to the store. Once in the store, the user uses the list as a reference for items that need to be purchased.

The recording of shopping lists on paper has several disadvantages. First, such paper shopping lists may easy to lose or misplace. Second, paper shopping lists do not allow easy organization and tracking of purchased and non-purchased items. Furthermore, the creation of paper shopping lists may be tedious and time-consuming.

Although shopping lists may be created electronically via a personal computer or other electronic devices, such lists must generally be printed out prior to being taken to the store. Thus, they suffer from a lot of the deficiencies of a paper shopping list without providing much added benefits.

Accordingly, there is a need for a more easy and efficient system and method for generating, storing, and utilizing shopping lists and other shopping related information.

SUMMARY OF THE INVENTION

The present invention is directed to an electronic shopping system that includes an electronic game apparatus with a portable memory module. The electronic game apparatus is configured to execute an interactive game program to allow a user to play an associated interactive game. The electronic game apparatus is also configured to execute a shopping program for allowing the user to generate a shopping list for storing in the portable memory module. The portable memory module is removed from the electronic game apparatus and transported to a retailer site during a shopping expedition. The electronic shopping system also includes a first store terminal including a first memory interface that communicates with the portable memory module for retrieving the shopping list. The electronic shopping system further includes a second store terminal including a second memory interface that communicates with the portable memory module during a purchase transaction.

In other embodiments, the portable memory module is also used to store customer profile information, electronic coupon information, electronic receipts, and/or information for activating a software program for execution by the electronic game apparatus. According to one embodiment, the information for activating the software program is written into the portable memory module by the second store terminal upon the satisfaction of a pre-determined criteria.

In a further embodiment, the invention is directed to an electronic shopping system that includes an electronic game apparatus with a portable memory module, and an automated teller machine. The electronic game apparatus is configured to download a software program and information for obtaining a key for activating the software program. The information for obtaining the key is stored in the portable memory module. The automated teller machine includes a means for interfacing with the portable memory module, means for obtaining bank account information for transferring payment for the software program, and means for downloading the key into the portable memory module based on the information stored in the portable memory module upon a successful transfer of the payment.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIG. 1A is a schematic block diagram of a home site in the system of FIG. 1 according to one embodiment of the invention;

FIGS. 2A-2C are schematic layout diagrams of information stored in a memory module of a gaming machine according to one embodiment of the invention;

DETAILED DESCRIPTION

Figure 1:
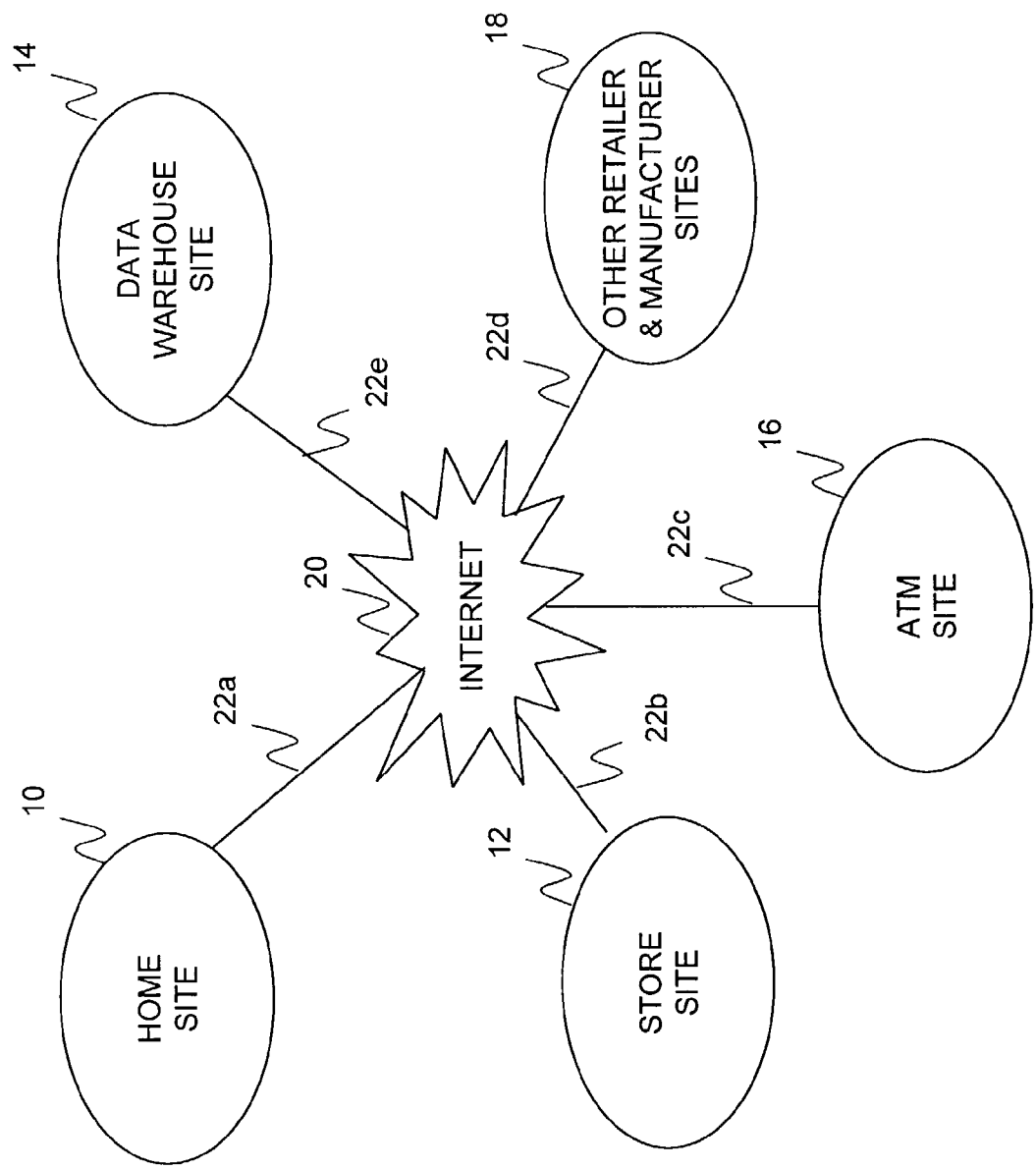
FIG. 1 is a schematic block diagram of a personal shopping data service system according to one embodiment of the invention.

FIG. 1 is a schematic block diagram of a personal shopping data service system according to one embodiment of the invention. According to this embodiment, the system includes a home site 10, a store site 12, a data warehouse site 14, an automated teller machine (ATM) site 16, and other retailer and manufacturer sites 18, that are interconnected to each other over a wide area computer network such as, for example, a public internet 20. The connection to the internet 20 may be achieved via internet connections 22a-22e implemented using cables or other wired or wireless transmission media that support data communication protocols such as, for example, an Internet Protocol (IP), Asynchronous Transfer Mode (ATM), or the like. A person skilled in the art should appreciate that one or more of the various sites may also be interconnected to each other over private networks such as private local area networks or the like.

FIG. 1A is a more detailed schematic block diagram of the home site 10 according to one embodiment of the invention. The home site 10 includes a gaming machine (also referred to as an electronic game apparatus) 24 connected to a display monitor 26 over a video/audio interface 28. The gaming machine 24 may be a conventional video game system provided by, for example, Sony®, Sega®, or Nintendo®. The gaming machine 24 includes a processor unit (not shown), a CD-ROM/DVD drive 30, and an input device 32. The processor unit includes logic for interacting with the CD-ROM/DVD drive 30 to execute an interactive game program, such as, for example, a conventional video game stored in a CD-ROM or DVD, to allow a user to play the interactive game. The processor unit further includes logic for interacting with the CD-ROM/DVD drive to execute a shopping program stored in the same or different CD-ROM or DVD. The shopping program allows the user to create, view, and edit a shopping list and other shopping related information.

The input device 32 may take the form of any input device known in the art, such as, for example, a control pad, joystick, mouse, keypad, keyboard, or microphone.

The gaming machine 24 may also include an internet connection 22a if communication over the internet 20 is desired. The internet connection 22a allows the gaming machine 24 to communicate over the internet 20 via any of the above-described communication protocols.

The gaming machine 24 according to the embodiment illustrated in FIG. 1A further includes a memory module 34 interacting with the processor unit. The memory module, in addition to serving its traditional role of storing game-related information, also functions to store shopping-related information. The shopping-related information includes shopping lists, shopping records, loyalty points, shopping profile information, coupons, promotional material, customer profile information, and the like. The memory module 34 may also be referred to as a memory card or memory stick.

According to one embodiment of the invention, the memory module 34 is removable from the gaming machine 24, allowing it to be easily transported from one location to another, such as, from the user's home site 10 to the store site 12, and vice versa. The memory module 34 may be smaller than a floppy disk, CD ROM, DVD, or other types of portable memory devices, allowing it to be easily transported in a purse, wallet, pocket, or the like. In addition, the memory module 34 may be less noisy and faster to execute than traditional portable memory devices.

According to one embodiment of the invention, the memory module 34 is implemented as an integrated circuit memory, such as, for example an electrically erasable field-programmable read-only memory (EEPROM), a flash ROM (FROM), CMOS RAM with battery backup, or the like. A person skilled in the art should recognize, however, that other electronic memory devices conventional in the art may be used to implement the memory module 34.

Figure 1B:
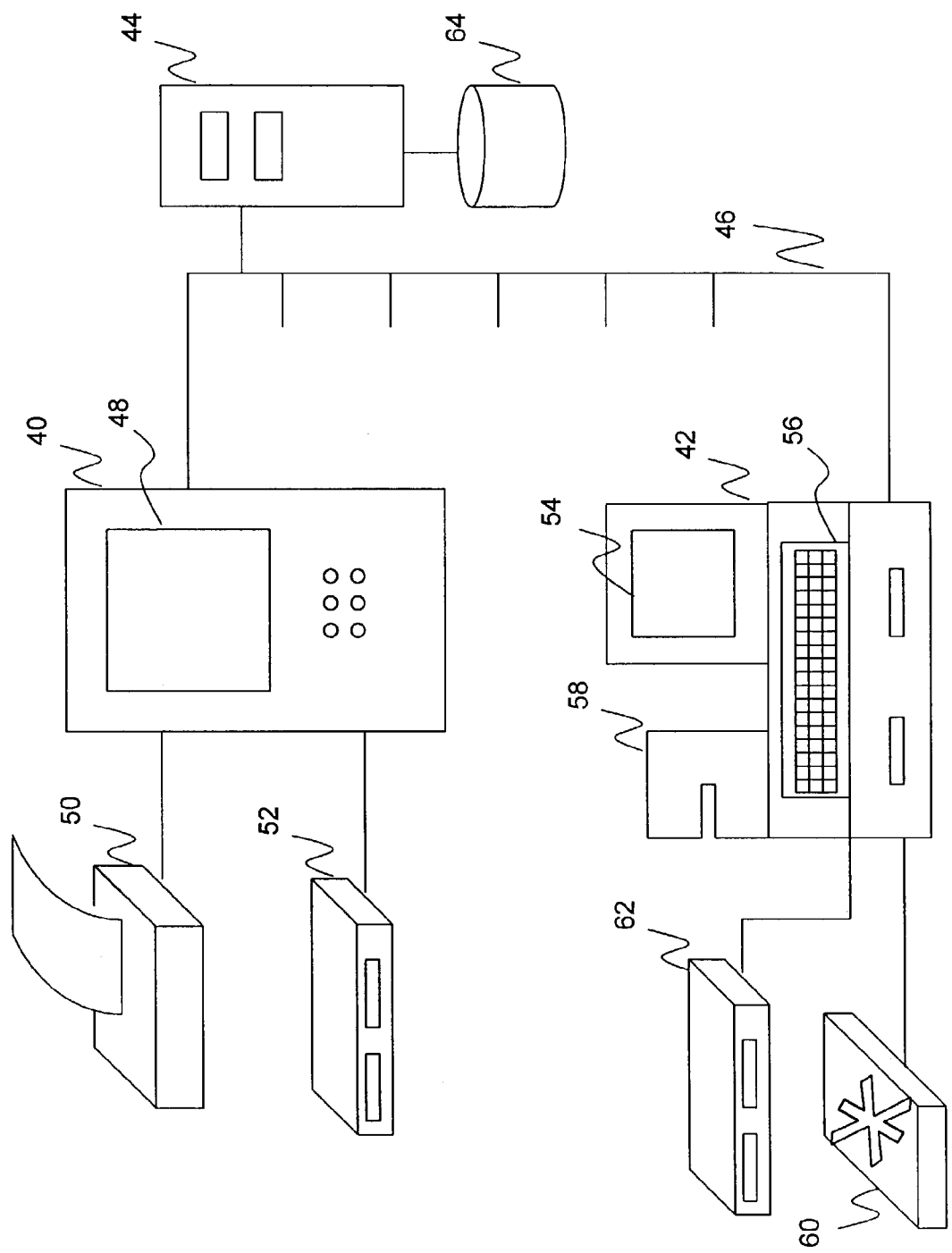
FIG. 1B is a schematic block diagram of a store site in the system of FIG. 1 according to one embodiment of the invention.

FIG. 1B is a more detailed schematic block diagram of the store site 12 according to one embodiment of the invention. The store site 12 includes one or more check-in terminals 40 and check-out terminals 42 electronically connected to a network server or store platform computer system (collectively referred to as a store server) 44 over a network signal bus 46 that is configured to support and operate as a local area network (LAN). The local area network may support a LAN communication medium, such as Ethernet or Token Ring. The Ethernet LAN communication medium is not limited to 10 megabit Ethernet, but may include other variants, such as Fast Ethernet, Gigabit Ethernet, 10 Gigabit Ethernet, and wireless Ethernet.

The check-in terminal 40 may be a kiosk terminal located near the entrance/exit of the retail store or conveniently positioned in one or more other places within the retail store. The check-in terminal 40 may, for instance, be mounted at the ends and along the shelves of aisles of the retail store. The check-in terminal 40 may also be mounted on a shopping cart that is used by a customer during his or her shopping expedition.

According to one embodiment of the invention, the check-in terminal includes a display screen 48 and a memory module interface 52, and an optional printer 50. The display screen may include pressure sensitive (touch screen) technology so that the user may interact with the check-in terminal 40 by merely touching certain portions of the screen. The display screen may also include, in addition or in lieu of the touch screen, a keyboard, keypad, joystick, microphone, and/or other input device for receiving input from the user.

The memory module interface 52 is configured to accept a gaming machine memory module 34 and read shopping related information stored in the memory module for launching one or more shopping related services to the user. At a minimum, the check-in terminal 40 allows the user to view a shopping list stored in the memory module and print the shopping list using the printer 50 if one has been provided. The check-in terminal may also allow the user to edit the shopping list if desired. The memory module interface 52 includes necessary circuitry and/or logic for automatically detecting the memory module 34 upon its insertion as well as the type of memory module 34 that has been inserted, according to mechanisms that are well known in the art.

The check-out terminal 42 includes components commonly found in traditional point-of-sale (POS) terminals located at customer check-out lanes. Such components include a display screen 54, an input device 56, a printer 58, and a barcode scanner 60. The check-out terminal 42 also includes a memory module interface 62 that may be similar to memory module interface 52, for interfacing with a customer's memory module 34 during check-out. The memory module interface 62 at the check-out terminal retrieves the customer's profile data, electronic coupons, and/or loyalty point information stored in the memory module 34 for applying it to the current purchase. The memory module interface 62 is also used to store new coupons, electronic receipts, loyalty points, and software key codes to enable a preferred customer software delivered to the customer.

The store server 44 includes one or more files and databases stored in a mass storage device 64 with merchandise and customer-related information. Particular such database and files include a price-lookup file, a transaction log file, and/or a customer database including demographic, personal preference, personal profile, and other information specific to each customer. The mass storage device 64 further stores various key codes that may be used to activate gaming and other types of software provided to customers as a reward for purchases that they have made.

A person skilled in the art should recognize that the store site 12 may include other terminals and devices that are conventional in the art. For instance, the store site 12 may include self-scanning terminals allowing the customer to self-scan items for checkout. When provided, such self-scanning terminals also include memory module interfaces allowing storage of the self-scanned items in the memory module.

Figure 1C:
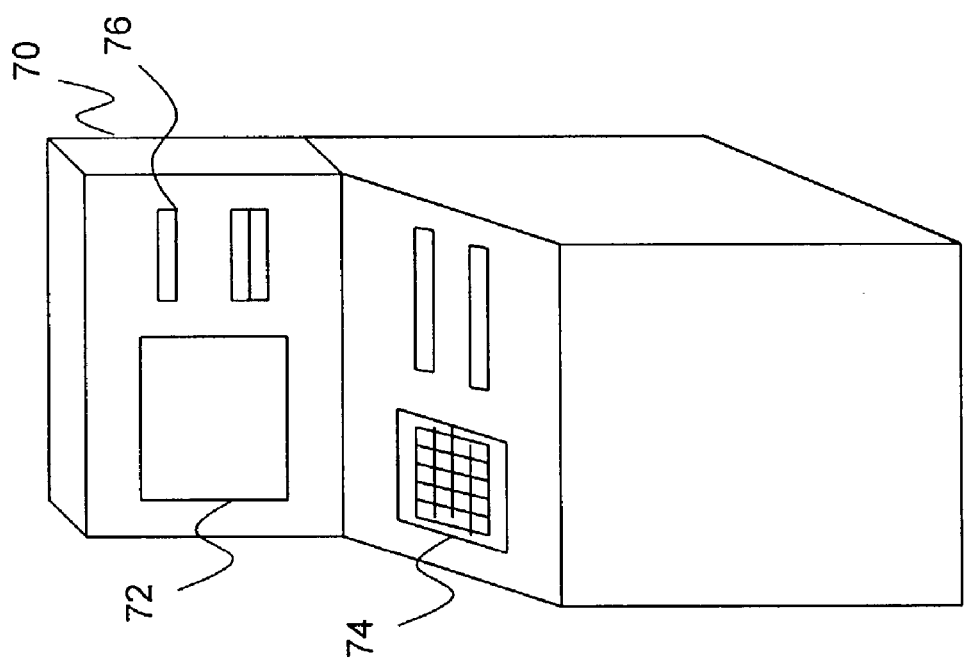
FIG. 1C is a schematic block diagram of an ATM site in the system of FIG. 1 according to one embodiment of the invention.

FIG. 1C is a more detailed schematic block diagram of the ATM site 16 according to one embodiment of the invention. The ATM site 16 includes an ATM machine 70 used by a customer for facilitating the payment of purchases made by the customer via the internet 20. The ATM machine 70 may be a conventional ATM machine known in the art, and may include a display screen 72 and an input device 74, such as a keypad, keyboard, microphone, or the like. Alternatively, the display screen 72 may incorporate touch screen technology for interacting with the ATM machine 70 by pressing portions of the screen.

According to one embodiment of the invention, the ATM machine 70 includes a memory module interface 76 for interfacing with the memory module 34 carried by a customer. The memory module interface 76 of the ATM machine may be similar to the memory module interfaces 52 and 62 of the check-in and check-out terminals 40, 42 at the store site 12. The memory module 34 may contain information needed by the ATM machine for completing payment of a purchase made by the customer.

In general terms, the personal shopping data service system illustrated in FIG. 1 allows a customer to use the gaming machine 24 to create a shopping list and perform other shopping related activities in an easy and convenient manner, making it popular for the users at home. The customer may engage in the shopping related activities during, prior, or after use of the gaming machine 24 to play an interactive video game program or other types of entertainment software programs.

According to one embodiment of the invention, a retailer transmits to a customer in a CD-ROM or DVD, a shopping program with merchandise information, promotional information, coupons, advertisements, and/or other shopping related information. The CD-ROM/DVD may also include video game software programs, computer software programs, music, video, or additional rewards (collectively referred to as preferred customer software) that may be accessed via a software key. The software key is provided by the retailer upon the meeting of a pre-determined criteria, such as, for example, after the customer has purchased a certain amount of goods from the retailer or has accumulated a certain number of loyalty points based on past purchases.

The customer executes the shopping program in the CD-ROM/DVD using the CD-ROM/DVD drive 30, and views the stored merchandise information using the display monitor 26. Such merchandise information may include textual or graphical descriptions of the products, their associated UPC or SKU numbers, prices, and the like.

The customer generates a shopping list by using the input device 32 and selecting items displayed on the display monitor 26. Information on the selected items, such as their SKU or UPC codes, are then stored in the memory module 34 as the customer's current shopping list. The customer may also at this time store the customer's name, customer ID, address, loyalty club membership information, and/or other customer profile data into the memory module 34 if not already stored. Such information may be manually entered by the customer via the input device 32. Alternatively, the customer may register its profile data at the retailer's web site over the internet connection 22a for storing in the customer database in the retailer's mass storage device 64. The customer may then access the profile data from the home site 10 or via the check-in terminal 40 at the store site 12 when he or she checks-in prior to commencing shopping, and store the profile data in the memory module.

The memory module 34 also stores coupons associated with the selected items that are retrieved from the CD-ROM/DVD. In the embodiment where the gaming machine 24 includes the internet connection 22a, the customer may use the gaming machine to access the retailer's or manufacturer's web site and pull product information, coupons, and the like, directly from the store server 44 at the store site 12 or from other retailers and manufacturers at the retailer and manufacturer sites 18, without the need of a CD-ROM/DVD.

When the customer is ready to make a shopping trip, he or she removes the memory module 34 from the gaming machine 24 and takes it on the trip. The memory module 34 may be transported in a wallet, purse, pocket, or the like. Once at the retailers store site 12, the customer may access a check-in terminal 40 to print the shopping list and/or other information stored in the memory module before commencing shopping at the store. In this regard, the user inserts the memory module 34 into the memory module interface 52 of the check-in terminal 40, causing one or more application software to be launched. The check-in terminal 40 may also be accessed anytime during the shopping process.

The one or more application software is launched upon the automatic detection of the insertion of the memory module 34, and allow various services to be provided to the customer. One type of application software allows the user to view and optionally print the shopping list and/or other information stored in the memory module. Another type of application software may suggest efficient shopping routes based on the items on the shopping list, while yet another type of application software may provide alternates to items listed on the shopping list based on promotional information, available inventory, and the like. Furthermore, if the memory module does not already contain the customer's profile information, an application software may be launched to retrieve such profile information from the customer database in the mass storage device 64 and store the information in the memory module 34.

If a self-scanning device is used in conjunction with the memory module 34 during the shopping process, the shopping list may be continuously displayed on a display of the self-scanning device. As items are scanned with the self-scanning device, a determination may be made if the item was included in the shopping list. If it was, the item may be marked as having a purchased status. The memory module 34 in this scenario may maintain a running total of the items that are purchased for facilitating the check-out process.

After the customer has selected the purchase items from the store, he or she proceeds to the check-out terminal 42 for checkout. During the checkout process, the customer inserts the memory module 34 into the memory module interface 62 coupled to the check-out terminal 42. The memory module interface 62 automatically detects the insertion of the memory module 34 and retrieves the customer's personal profile data as well as any electronic coupons stored in the module.

During the checkout process, the items selected for purchase are scanned using the scanner 60 if not already scanned via a self-scanning device. The scanner is capable of sensing and interpreting a universal product code (UPC) or stock keeping unit (SKU) code printed, or tagged, on each item of merchandise to be purchased, as a barcode. The check-out terminal 42 transmits the UPC/SKU code to the store server 44 which interprets the UPC/SKU, accesses the mass storage device 64 to determine the price for each item, and transmits the price and information about the scanned product to the check-out terminal.

The check-out terminal 42 maintains a running total of the purchase price as each item is scanned. At the end of the transaction, the check-out terminal prints a receipt of the purchase using the printer 58. In another embodiment, the receipt is written into the memory module 34 as an electronic receipt.

Other data may also be written into the memory module 34 by the check-out terminal 42, such as, for example, coupons, promotional material, and the like. If the customer has purchased a sufficient amount of goods at the store, accumulated enough store loyalty points, or has met some other shopping related threshold, a software key code may also be written into the memory module 34 for enabling a preferred customer software delivered to the customer. The user may then use the key code to activate and use the software via the gaming machine 24.

According to one embodiment of the invention, customer purchase data taking the form of, for example, electronic receipts, are also transmitted to the data warehouse site 14 over the internet 20 for providing benefits to the customer. Such benefits may include electronic coupons, rebates, sweepstake entries, money management services, and the like. The data warehouse site may also collect and store merchandise information, sales information, customer information, and the like. The data warehouse site may use the collected information to generate purchase statistics and reports for transmitting to retailers and manufacturers at the retailer and manufacturer sites 18.

Purchase data provides valuable information to retailers, manufacturers, and other business groups. The information may be used, for instance, to devise marketing plans, inventory control plans, manufacturing plans, and the like. For example, purchase information may be used to provide retail price comparisons or market share analyses for certain products. The information may also be used to forecast sales of new products, analyze shopping trends (e.g. based on geography, age, or income), or evaluate marketing strategies, such as, for example, the effect of advertisements or coupons.

According to one embodiment of the invention, the gaming machine 24 may be used to purchase products over the internet 20. For example, a user of the gaming machine may purchase computer software, game software, or other types of software prior, during, or after a game. In this scenario, the purchased software is downloaded from the internet 20 and stored in the memory module 34. Alternatively, the software is downloaded into a different memory device such as, for example, a memory hosted by a personal computer.

According to one embodiment of the invention, the downloaded software is not operable until a key code is provided after payment for the software. If the customer does not want to make the payment right away or does not want to provide his or her credit card information over the internet 20, sufficient information is downloaded to the memory module 34 for allowing the customer to retrieve the key code once the payment has been made. For example, the information downloaded to the memory module 34 may be the URL of a web site storing the key code, a key identifier, purchase price, and the like.

According to one embodiment of the invention, the customer effectuates payment for the downloaded software from the ATM site 16 using the ATM machine 70. In this regard, the user removes the memory module 34 from the gaming machine 24 and takes it to the ATM site 16. The user inserts the memory module 34 into the ATM's memory module interface 76 which loads the contents of the memory module into its internal memory. The user may further insert an ATM card provided by the user's bank for accessing the user's bank account, or the bank account information may be stored as part of the user's profile information in the memory module 34. If the URL of a web site to contact for obtaining the key code is contained in the memory module 34, the ATM machine proceeds to contact the web site via its internet connection 22c. According to one embodiment, the web site provides the information needed by the ATM machine to complete payment for the software by transferring money from the user's bank account using the secure ATM hardware and banker's network. Upon a successful transfer of the money, the key code for activating the software is downloaded from the web site into the memory module 34. The key code may then be used to activate the downloaded software.

FIGS. 2A-2C are schematic layout diagrams of information stored in the memory module 34 according to one embodiment of the invention. According to the illustrated embodiment, the memory module 34 includes a list of starting addresses 100 denoting the beginning location of various types of information. Such information may include shopping list entries 102, 104, electronic coupon entries 106, 108, key code entries 110, electronic receipt entries 112, and customer profile entries 114.

Each shopping list entry 102, 104 begins with a header 102a, 104a and ends with an end-of-list flag 102b, 104b. Stored in the shopping list entry is a retailer identifier 102c, 104c such as, for example, a retailer name, and a date 102d, 104d on which the shopping list was created. The shopping list entry 102, 104 further includes a list of item codes (UPC or SKU) and quantities 102e, 104e of the items selected by the user to be purchased at the retailer's store.

Each coupon entry 106, 108 begins with a header 106a, 108a, and includes a coupon code 106b, 106c identifying the coupon, and a URL address 106c, 108c of a web site where the coupon may be obtained. The URL information allows retailers and manufacturers to analyze the effect of advertising at various web sites. The gaming machine 24 itself may then access the website and download the coupon over the internet connection 20a for storing in the memory module 34, or the coupon may be accessed by the check-out terminal 42 during checkout. Alternatively, instead of the URL address, each coupon entry may include the actual coupon information such as, for example, a product code, a dollar amount, and an expiration date.

The key code entry 110 of the memory module 34 includes a key code header 110a, key information 110b, and a key code area 110c. The key information 110b identifies a key number, name, or other indicia of a key code to be downloaded. In the embodiment where the key code is obtained via the ATM machine 70 upon payment for the software, the key information further includes a URL of a website from which the key code is to be downloaded.

The key code area 110c allows the storing of a key code provided by the retailer upon the meeting of a shopping-related threshold, or by the ATM machine 70 upon a successful transfer of payment for a purchased software. The key code may then be used to enable the software.

The electronic receipt entry 112 of the memory module 34 starts with a receipt header 112a and includes information typically contained in a paper receipt. Such information includes a date 112b of the purchase, a retailer identifier 112c, and a list of item codes 112d, quantities 112e, and prices 112f of items purchased by the user. The receipt entry further includes a sub-total 112g of the purchase, tax paid 112h, and a total purchase amount 112i.

The personal profile entry 114 of the memory module 34 starts with a personal profile data header 114a and includes information associated with the user. Such information includes but is not limited to the user's name 114b, address 114c, age 114d, and a store loyalty club membership ID 114e. The personal profile entry 114 may also include other customer profile information 114f such as, for example, information on the user's preferences, hobbies, interests, or the like.

In addition to the above, the memory module 34 may also store other types of data not depicted in FIGS. 2A-2C. For example, the memory module 34 may store advertisements, promotional information, and/or the actual software for which the key code is used. In addition, the memory module 34 may store information associated with the video games played by the user.

Figure 3:
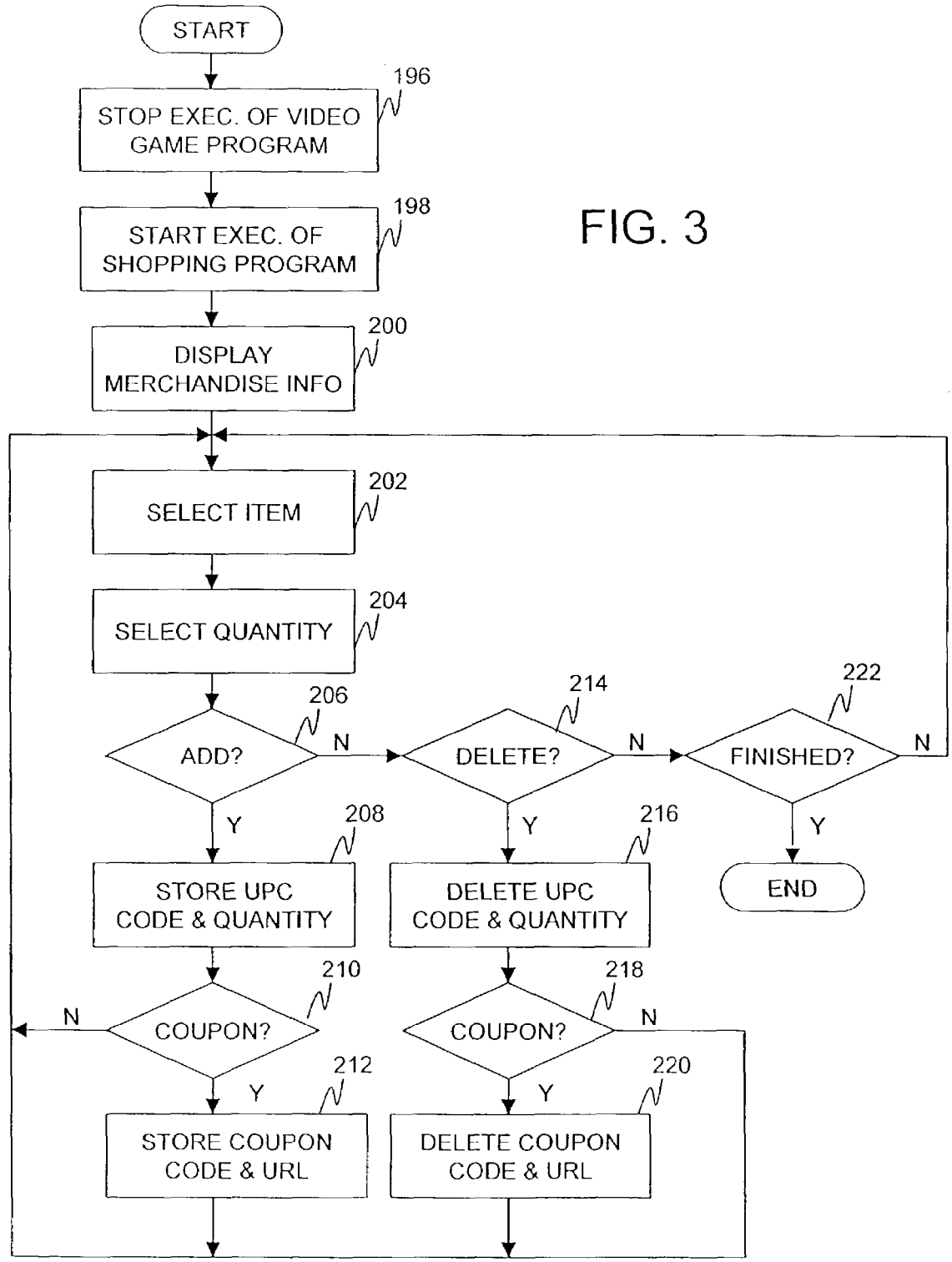
FIG. 3 is a flow diagram of a process for creating a shopping list with a gaming machine according to one embodiment of the invention.

FIG. 3 is a flow diagram of a process for creating a shopping list with the gaming machine 24 according to one embodiment of the invention. The process starts, and in step 196, the processor unit stops execution of any video game program that the user may be playing, and in step 198, starts execution of the shopping program. In step 200, the merchandise information provided by the retailer in the CD-ROM/DVD is displayed on the display monitor 26. In step 202, the customer selects one of the displayed items using the input device 32 coupled to the gaming machine 24. In step 204, the user indicates a quantity of the item to be purchased. In step 206, a determination is made by the gaming machine's processor unit whether the user has selected to add the item to the shopping list as determined in step 206, delete the item from the shopping list as determined in step 214, or finish creating the shopping list as determined in step 222.

If the user has indicated that the item is to be added to the shopping list, the processor preferably stores the item's UPC/SKU code along with the indicated quantity as a shopping list entry 102, 104 in the memory module 34. In step 210, the processor determines if a coupon is available for the selected item. If the answer is YES, a corresponding coupon code for the item is retrieved and stored along with its URL address as an electronic coupon entry 106, 108 in the memory module 34. In an alternative embodiment, all coupons provided by the retailer in the CD-ROM/DVD is stored in the memory module 34 for taking during a shopping trip.

If the user has indicated that the selected item is to be deleted from the shopping list, the processor preferably searches for the corresponding UPC/SKU code in the memory module 34 and deletes it from the memory. In step 218, the processor further searches for a corresponding coupon. If a coupon is found, information stored for the coupon is also deleted in step 220. Alternatively, the coupon is left in the memory module 34 in anticipation of the user changing his or her mind once in the store and deciding to purchase the item.

Figure 4:
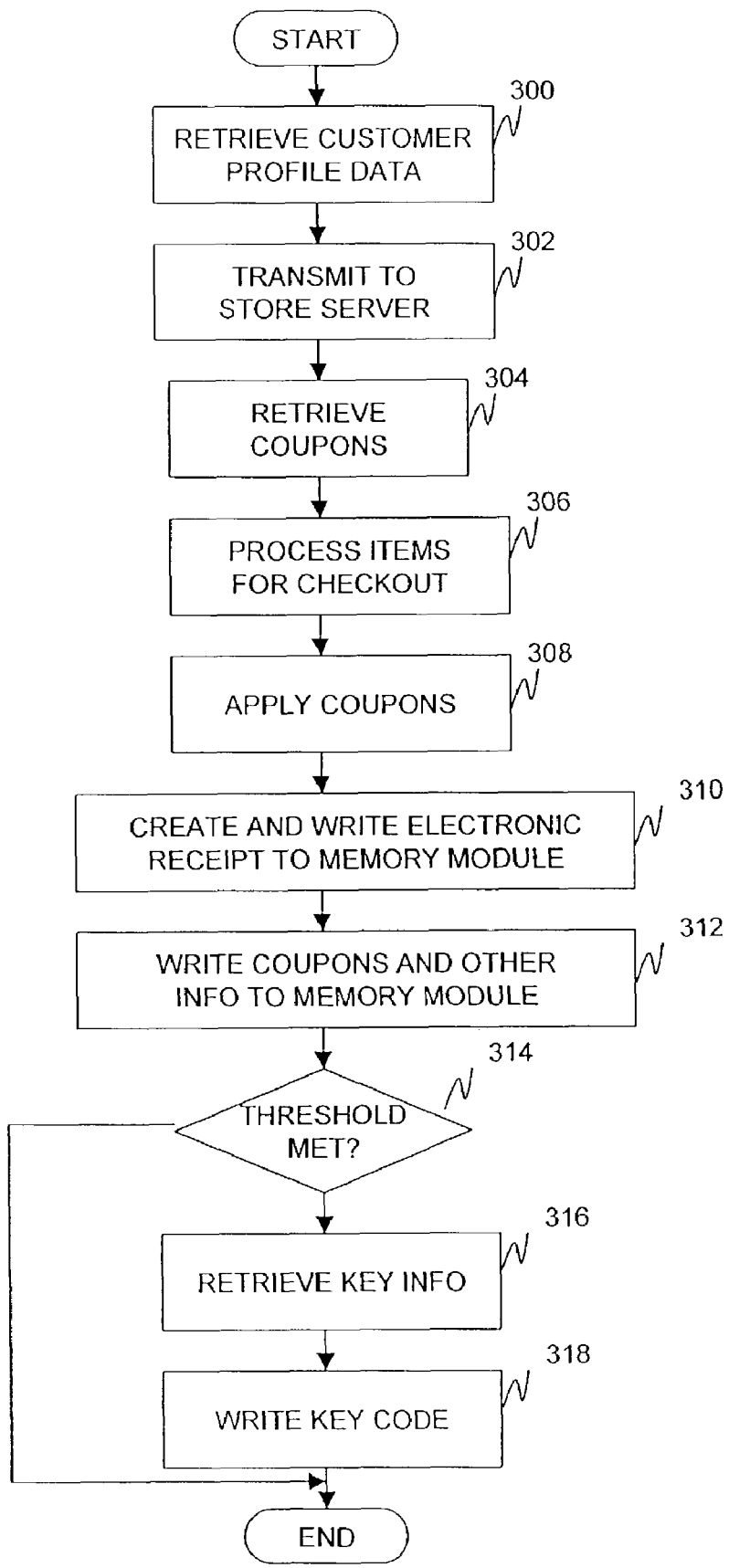
FIG. 4 is a flow diagram of a checkout process undertaken by a check-out terminal according to one embodiment of the invention.

FIG. 4 is a flow diagram of a checkout process undertaken by the check-out terminal 42 according to one embodiment of the invention. Upon insertion of the memory module 34 into the check-out terminal's memory module interface 62, the stored customer profile entry 114 is retrieved from the memory module and transmitted to the store server in step 302 via the network signal bus 46. The store server 44 may use the customer profile data to retrieve the customer's record from the mass storage device 64. Updates to the customer record may then be made, such as, for example, updating the customer's purchase history, increasing the customer's loyalty points, and/or making other additions or updates to the customer's record based on the current purchase.

In step 304, the check-out terminal 42 further retrieves from the memory module 34 electronic coupon entries 106, 108 for applying to the purchased items. In step 306, the items selected for purchase are processed for checkout. In this regard, the UPC/SKU in the barcode affixed to each item is scanned via the scanner 60 and transmitted to the store server 44. The store server preferably interprets the UPC/SKU, accesses the mass storage device 64 to determine the price for each item, and transmits the price and information about the scanned product to the check-out terminal. The check-out terminal adds the price of the item to the running total purchase price.

In step 308, the coupons retrieved from the memory module 34 are applied to the purchase price. In doing so, the store server 44 may access the URL address associated with each coupon for retrieving the appropriate discount amount, expiration date, product code, and the like. The store server 44 further generates a log file of used coupons for requesting a rebate from the manufacturer for a manufacturer's coupon, or for sales promotion analysis for the retailer's coupon.

In step 310, the check-out terminal preferably creates and writes an electronic receipt of the purchase into the memory module 34. This allows the customer to easily maintain a record of past purchases, organize/sort the record based on desired criteria, and/or transfer the records to other devices.

In step 312, the check-out terminal receives coupons and additional information from the store server 44 for writing into the memory module 34. The store server 44 may select such coupons and information from its mass storage device 64 based on analysis of the user's purchase history, preferences, merchandise promotions, and the like. The store server 44 may also forward any coupons received from the data warehouse site 14.

In step 314, a determination is made as to whether the customer has met a shopping-related threshold. The threshold may relate, for instance, to a purchase amount or accrued loyalty points. If the answer is YES, the key information 110b is retrieved from the memory module 34 for identifying the appropriate key code to be provided to the customer from the mass storage device 64. The store server 44 retrieves the appropriate key code from the mass storage device and transmits it to the check-out terminal 42 for writing to the memory module 34 in step 318.

Figure 5:
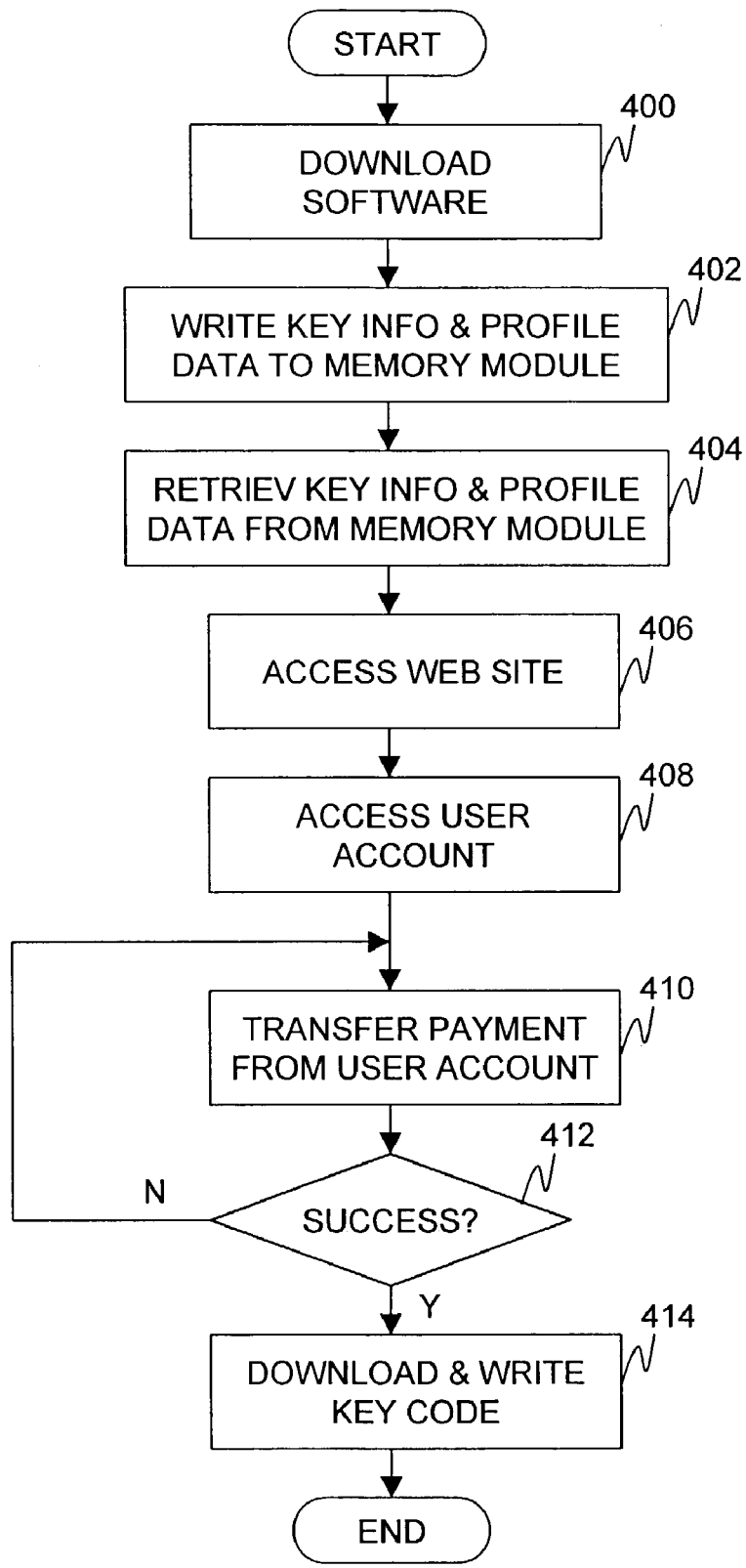
FIG. 5 is a flow diagram of a process for on-line purchases of software using a gaming machine and an automated teller machine according to one embodiment of the invention.

FIG. 5 is a flow diagram of a process for on-line purchases of software using the gaming machine 34 and memory module 34 according to one embodiment of the invention. In step 400, the user accesses a web site and downloads a desired software from the site using the gaming machine 24. According to one embodiment of the invention, the software is disabled until a key code is provided.

The downloaded software is stored in the memory module 34 or in a separate memory device. In addition to the software, key information corresponding to the key code activating the software is downloaded from the web site and written to the memory module 34 in step 402. User profile data provided by the user while accessing the web site may also be downloaded to the memory module.

Instead of paying for the software over the internet, the user removes the memory module 34 with the downloaded information and carries it to the ATM site 16 for making the payment. Upon insertion of the memory module 34 into the ATM machine's memory module interface 76, the ATM machine 16 retrieves from the memory module the stored key information and profile data. According to one embodiment of the invention, the key information includes the URL of the web site where the appropriate key code may be obtained.

In step 406, the ATM machine accesses the identified web site via its internet connection 22c. In step 408, the ATM machine identifies the user's bank account information based on the user profile data downloaded from the memory module 34 and/or ATM card inserted by the user, and accesses the user's bank account. In step 410, the ATM machine attempts to transfer the purchase amount from the user's bank account using the secure ATM hardware and banker's network. If the transfer is a success, as determined in step 412, the ATM machine identifies the key code to download based on the key information. In step 414, the ATM machine downloads the identified key code from the web site and writes the key as a key entry in the memory module 34.

The user takes the memory module 34 with the key code and uses it to activate the purchased software. Once activated, the key code information in the memory module 34 may be erased, and the portion of the memory freed for storing other information.

Although this invention has been described in certain specific embodiments, those skilled in the art will have no difficulty devising variations to the described embodiment which in no way depart from the scope and spirit of the present invention. For example, although the above-embodiments only illustrate the payment of software purchases with the ATM machine 70, a person of skill in the art should recognize that payments may be made for any product or service purchased over the Internet.

Moreover, to those skilled in the various arts, the invention itself herein will suggest solutions to other tasks and adaptations for other applications. It is the applicants intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

The invention claimed is:

1. An electronic shopping system comprising:
an electronic game apparatus including a portable memory module, the electronic game apparatus being configured to execute an interactive game program for allowing a user to play an associated interactive game, the electronic game apparatus being further configured to execute a shopping program for allowing the user to generate a shopping list for storing in the portable memory module, the portable memory module configured to be removed from the electronic game apparatus and transported to a retailer site;
a first store terminal including a first memory interface, the first memory interface configured to communicate with the portable memory module for retrieving the shopping list; and
a second store terminal including a second memory interface, the second memory interface configured to communicate with the portable memory module during a purchase transaction and write into the portable memory module a key code that activates the interactive game program responsive to a determination that the purchase transaction satisfies a predetermined condition.

2. The electronic shopping system of claim 1, wherein the electronic game apparatus is configured to display product information associated with a plurality of merchandise items for receiving a user selection of an item to be inserted into the shopping list.

3. The electronic shopping system of claim 1, wherein the portable memory module is further configured to store customer profile information.

4. The electronic shopping system of claim 3, wherein the second store terminal is configured to retrieve the customer profile information for retrieving a customer record.

5. The electronic shopping system of claim 1, wherein the portable memory module is configured to store electronic coupon information.

6. The electronic shopping system of claim 5, wherein the second store terminal is configured to write the electronic coupon information into the portable memory module.

7. The electronic shopping system of claim 5, wherein the second store terminal is configured to retrieve the electronic coupon information for applying to a current purchase.

8. The electronic shopping system of claim 1, wherein the second store terminal is configured to write an electronic receipt associated with the purchase transaction into the portable memory module.

9. The system of claim 1, wherein the second store terminal is operably coupled to a store server storing a plurality of key codes, and wherein the portable memory module stores identification information for the interactive game program, the determination that the purchase transaction satisfies a predetermined condition including:
determining whether the user has met a threshold amount via the purchase transaction;
retrieving the identification information from the portable memory module responsive to the determination;
identifying the key code based on the identification information; and
retrieving the identified key code from the mass storage device.

10. The system of claim 9, wherein the threshold amount is an accrued purchase amount.

11. The system of claim 9, wherein the threshold amount are accrued loyalty points.

12. The system of claim 1, wherein the key code is provided as a reward to the user for satisfying the predetermined condition.

13. An electronic game apparatus for use in an electronic shopping system, the electronic game apparatus comprising:
a portable memory module configured to store a key code for an interactive game program, and product information associated with one or more merchandise items selected by the user upon execution of a shopping program;
a memory interface coupled to the portable memory module;
an input configured to receive the user selections;
a display configured to display the product information associated with the one or more merchandise items; and
a processor unit coupled to the memory interface, input, and display, the processor configured to activate the interactive game program based on the key code and execute the interactive game program for allowing a user to play the associated interactive game, the processor further configured to execute the shopping program for allowing the user to store in the portable memory module the product information of the merchandise items selected by the user via the input, the portable memory module configured to be de-coupled from the memory interface and transported to a retailer site for use during shopping, wherein the key code is written into the portable memory module at the retailer site in response to a determination that a purchase transaction satisfies a predetermined condition.

14. The electronic game apparatus of claim 13, wherein the portable memory module is further configured to store customer profile information.

15. The electronic game apparatus of claim 13, wherein the portable memory module is configured to store electronic coupon information.

16. The electronic game apparatus of claim 13, wherein the portable memory module is configured to store an electronic receipt.

17. The electronic game apparatus of claim 13 further comprising a network connection for downloading the interactive game program and information for obtaining the key code for activating the interactive game program, the information for obtaining the key code being stored in the portable memory module.

18. A method for utilizing an electronic game apparatus configured to execute an electronic game and a shopping program, the electronic game apparatus having a portable memory module, a memory interface, and a display, the method comprising:

retrieving a key code from the portable memory module, wherein the key code is written into the portable memory module by a retailer during a purchase transaction of one or more merchandise items responsive to a determination that the purchase transaction satisfies a predetermined condition;

activating the electronic game based on the key code;

executing the electronic game and the shopping program via the electronic game apparatus;

displaying one or more merchandise items provided by the shopping program on the display;

receiving a user selection of a displayed item;

inserting the selected item into a shopping list;

storing the shopping list and information related to the electronic game into the portable memory module;

de-coupling the portable memory module from the memory interface for transporting to a retailer site; and using the portable memory module at the retailer site during shopping.

19. The method of claim 18 further comprising storing customer profile information into the portable memory module.

20. The method of claim 19, wherein the using of the portable memory module comprises retrieving the customer profile information from the portable memory module for retrieving a customer record.

21. The method of claim 18 further comprising storing electronic coupon information into the portable memory module.

22. The method of claim 21, wherein the using of the portable memory module comprises retrieving the electronic coupon information from the portable memory module for applying to a current purchase.

23. The method of claim 18 further comprising storing an electronic receipt associated with a current purchase into the portable memory module.

24. The method of claim 18, wherein the using of the portable memory module comprises retrieving the shopping list from the portable memory module.

25. The method of claim 18 further comprising:

downloading the electronic game and information for obtaining the key code for activating the electronic game; and storing the information for obtaining the key code in the portable memory module.

26. The method of claim 18, wherein the key code is provided to the user as a reward for satisfying the predetermined condition.

27. The method of claim 18, wherein the writing of the key code includes:

determining whether the user has met a threshold amount via the purchase transaction;

retrieving identification information from the portable memory module responsive to the determination;

identifying the key code based on the identification information; and retrieving the identified key code from a mass storage device.

28. A method for utilizing an electronic game apparatus having a portable memory module and memory interface, the method comprising:

providing to a user a first program for playing a computer game and a second program for generating a shopping list including one or more merchandise items;

coupling the portable memory module to the memory interface;

executing the second program via the electronic game apparatus and generating the shopping list;

storing the shopping list in the portable memory module;

de-coupling the portable memory module from the memory interface for transporting to a retailer site;

coupling the portable memory to a terminal at the retailer site during purchase of the one or more merchandise items;

determining whether the user has satisfied a predetermined condition via the purchase of the one or more merchandise items;

retrieving identification information from the portable memory module in response to the determination;

identifying a key code based on the identification information;

retrieving the identified key code from a mass storage device storing a plurality of key codes for different game programs;

writing the retrieved key code into the portable memory module;

coupling the portable memory module to the memory interface;

retrieving the key code from the portable memory module; and activating the first program based on the key code.

29. The method of claim 28 further comprising:

providing a plurality of merchandise coupons, wherein the executing of the second program automatically retrieves one or more of the plurality of merchandise coupons associated with the one or more merchandise items and stores the retrieved one or more merchandise coupons in the portable memory module.

30. The method of claim 29 further comprising:

automatically retrieving, by the terminal, the one or more merchandise coupons stored in the portable memory module; and automatically applying the retrieved merchandise coupons to a purchase transaction.

31. The method of claim 28 further comprising:

storing by the terminal into the portable memory module, an electronic receipt evidencing purchase of the one or more merchandise items.

* * * * *